US006766445B2

(12) United States Patent
Schlansker et al.

(10) Patent No.: US 6,766,445 B2
(45) Date of Patent: Jul. 20, 2004

(54) STORAGE SYSTEM FOR USE IN CUSTOM LOOP ACCELERATORS AND THE LIKE

(75) Inventors: Michael Steven Schlansker, Los Altos, CA (US); Vinod Kumar Kathail, Cupertino, CA (US); Shail Aditya Gupta, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 578 days.

(21) Appl. No.: 09/816,851

(22) Filed: Mar. 23, 2001

(65) Prior Publication Data

US 2002/0138718 A1 Sep. 26, 2002

(51) Int. Cl.[7] .............................................. G06F 9/40
(52) U.S. Cl. ..................................................... 712/241
(58) Field of Search .......................... 712/241; 711/109, 711/110

(56) References Cited

U.S. PATENT DOCUMENTS

| 3,944,989 A | * | 3/1976 | Yamada ....................... 711/110 |
| 4,078,258 A | * | 3/1978 | Lindsey et al. .............. 711/110 |
| 4,097,920 A | * | 6/1978 | Ozga ............................ 712/241 |
| 4,437,166 A | * | 3/1984 | O'Brien ....................... 711/109 |
| 5,958,048 A | * | 9/1999 | Babaian et al. .............. 712/241 |
| 6,226,776 B1 |  | 5/2001 | Panchul ......................... 716/3 |

FOREIGN PATENT DOCUMENTS

| EP | 0286356 | 10/1988 |
| EP | 0416513 | 3/1991 |
| EP | 0254123 | 1/1998 |

OTHER PUBLICATIONS

S Aditya et al—Automatic Architectural Synthesis of VLIW and EPIC Processors—System Synthesis 1999—Proceedings 12th International Symposium –Nov. 1999 –pp. 107–113.

* cited by examiner

Primary Examiner—Eric Coleman

(57) ABSTRACT

A computational unit for use in loop computations. The computational unit includes a function unit, a plurality of phase lines, and a storage register. The computational unit is programmed to initiate one iteration of the loop every II cycles. Each function unit has a result output for outputting one computational result each cycle. There is one phase line corresponding to each of the II cycles. The storage register includes a linear connected array of shift cells having a first shift cell. Each shift cell has an input port, an output port, a shift control port, and an OR gate. Each shift cell receives the value to be stored in the shift cell on the input port, the stored value being stored in response to a control signal on the shift control port. The OR gate has an output connected to the shift enable port and one input for each cycle on which that shift cell is to receive the control signal, that input being connected to the phase line corresponding to that cycle. The input port of the first shift cell is connected to the result output. A plurality of such computational units can be connected together to form a loop accelerator. The accelerator includes a cross-connect circuit for coupling at least one shift cell output of one of the computational units to an input of a function unit of another of the computational units on a selected one of the II cycles.

15 Claims, 6 Drawing Sheets

STORAGE SYSTEM FOR USE IN CUSTOM LOOP ACCELERATORS AND THE LIKE

FIELD OF THE INVENTION

The present invention relates to computer hardware, and more particularly, to a hardware structure for use in custom hardware accelerators used to expedite loops.

BACKGROUND OF THE INVENTION

Computer programs often make use of "loops" to process data. A loop consists of a network of operations that are repeatedly applied to a stream of input data to generate a stream of results. Custom integrated circuits likewise make use of such loops.

Hardware arrangements designed to accelerate the computation of loops are known to the art. In general, these hardware structures employ a plurality of function units working on different iterations of the loop to reduce the time needed to compute the loop by overlapping the computations of a number of loop iterations. The highest degree of overlap is obtained when a distinct function unit executes each operation within the body of the loop, and a new iteration is initiated on every clock cycle. In this case, there is a simple one-to-one correspondence between hardware function units and operations within the program graph as well as a simple correspondence between dataflow edges in the program graph and actual hardware datapaths. Simple one-to-one solutions are very efficient because they feature a minimal set of resources that are all busy on every cycle. Such designs, however, are often too costly. Less costly designs utilize schemes in which a plurality of function units are used to provide overlapped computations; however, the ensemble of function units only initiates a loop iteration every II cycles, where II>1.

In general, one iteration of the loop generates values that are needed in subsequent computations, either in the current iteration or in a subsequent iteration. These values must be stored in some form of high-speed storage that is accessible to all of the function units that require these values. The cost of this storage represents a significant fraction of the cost of a hardware loop accelerator.

Broadly, it is the object of the present invention to provide an improved hardware accelerator architecture for accelerating loops.

It is a further object of the present invention to provide a high-speed storage system for use in hardware accelerators and the like.

These and other objects of the present invention will become apparent to those skilled in the art from the following detailed description of the invention and the accompanying drawings.

SUMMARY OF THE INVENTION

The present invention is a computational unit for use in loop computations. The computational unit includes a function unit, a plurality of phase lines, and a storage register. The computational unit is programmed to initiate one iteration of the loop every II cycles. The function unit has a result output for outputting one computational result each cycle. There is one phase line corresponding to each of the II cycles. The storage register includes a linear connected array of shift cells having a first shift cell. Each shift cell has an input port, an output port, a shift control port, and an OR gate. Each shift cell receives the value to be stored in the shift cell on the input port, the stored value being stored in response to a control signal on the shift control port. The OR gate has an output connected to the shift enable port and one input for each cycle on which that shift cell is to receive the control signal, that input being connected to the phase line corresponding to that cycle. The input port of the first shift cell is connected to the result output. A plurality of such computational units can be connected together to form a loop accelerator. The accelerator includes a cross-connect circuit for coupling at least one shift cell output of one of the computational units to an input of a function unit of another of the computational units on a selected one of the II cycles.

DETAILED DESCRIPTION OF THE INVENTION

Figure 1:
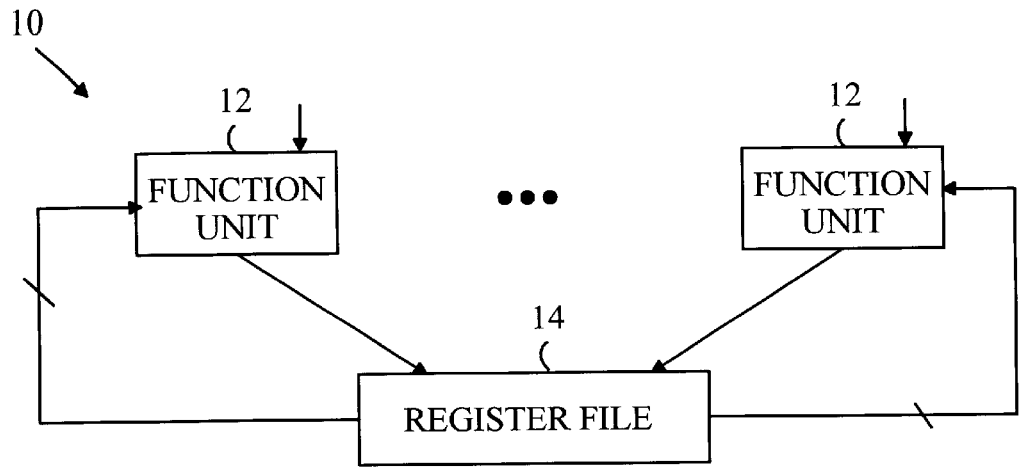
FIG. 1 is a block diagram of a prior art hardware loop accelerator 10.

The manner in which the present invention provides its advantages can be more easily understood with reference to FIG. 1 which is a block diagram of a prior art hardware loop accelerator 10. Accelerator 10 includes a number of function units 12 and a register file 14 for storing results generated in one iteration of a loop that are needed in some later iteration of the loop. Since the function units are typically operating at very high speeds, the register file must also operate at very high speeds. Hence, the cost of the register file is a significant fraction of the cost of the loop accelerator.

Figure 2:
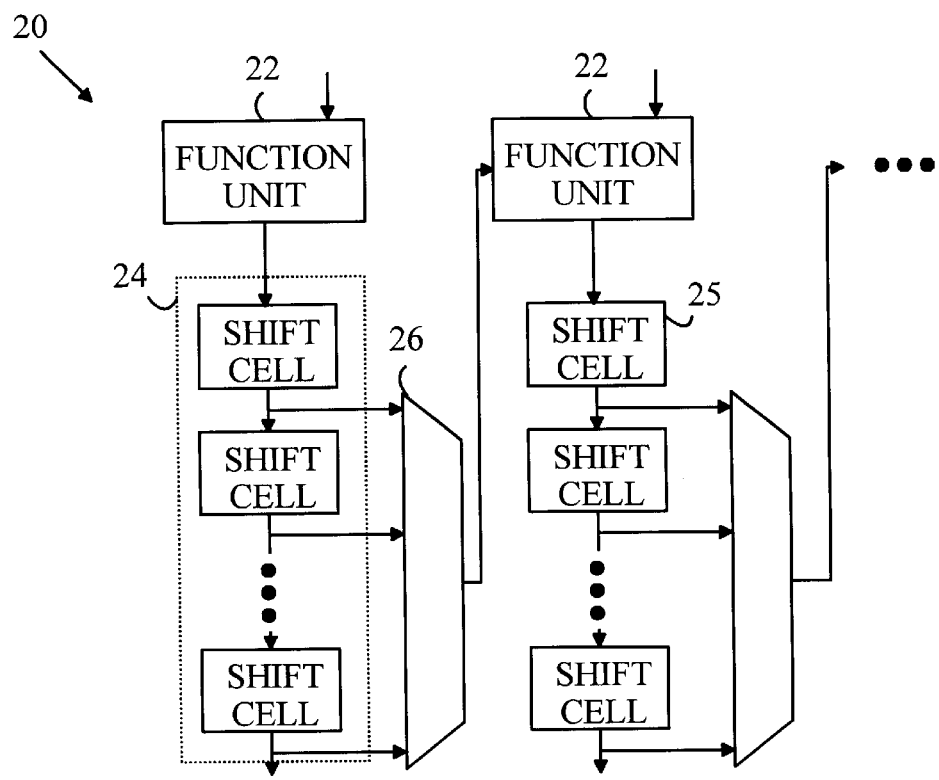
FIG. 2 is a block diagram of a hardware loop accelerator that utilizes shift registers.

One method for implementing the scheme shown in FIG. 1 is to use a series of shift registers to hold the intermediate results. A hardware loop accelerator that utilizes shift registers is shown in FIG. 2 at 20. In accelerator 20, each function unit 22 outputs its results to a shift register 24 constructed from a series of cells 25. On each cycle, a new function result is shifted into the upper most cell of the shift register, and the previously stored results are shifted downward. A multiplexer 26 provides a means for selecting one of the values stored in the shift register for use by the adjacent function unit. Additional multiplexers may be included if the results are needed by more than one function unit.

The length of the shift registers is determined by the number of cycles over which a result is still needed for use in a computation. If a result is still needed, the result will be referred to as being "live". The longest-lived result determines the length of the shift register. It should be noted that the shift register must store all of the results computed after a live result even if these results are "dead", i.e., not needed for future computations. Hence, this form of prior art accelerator requires very large shift registers and multiplexers, which increase the cost of the accelerator.

Figure 3:
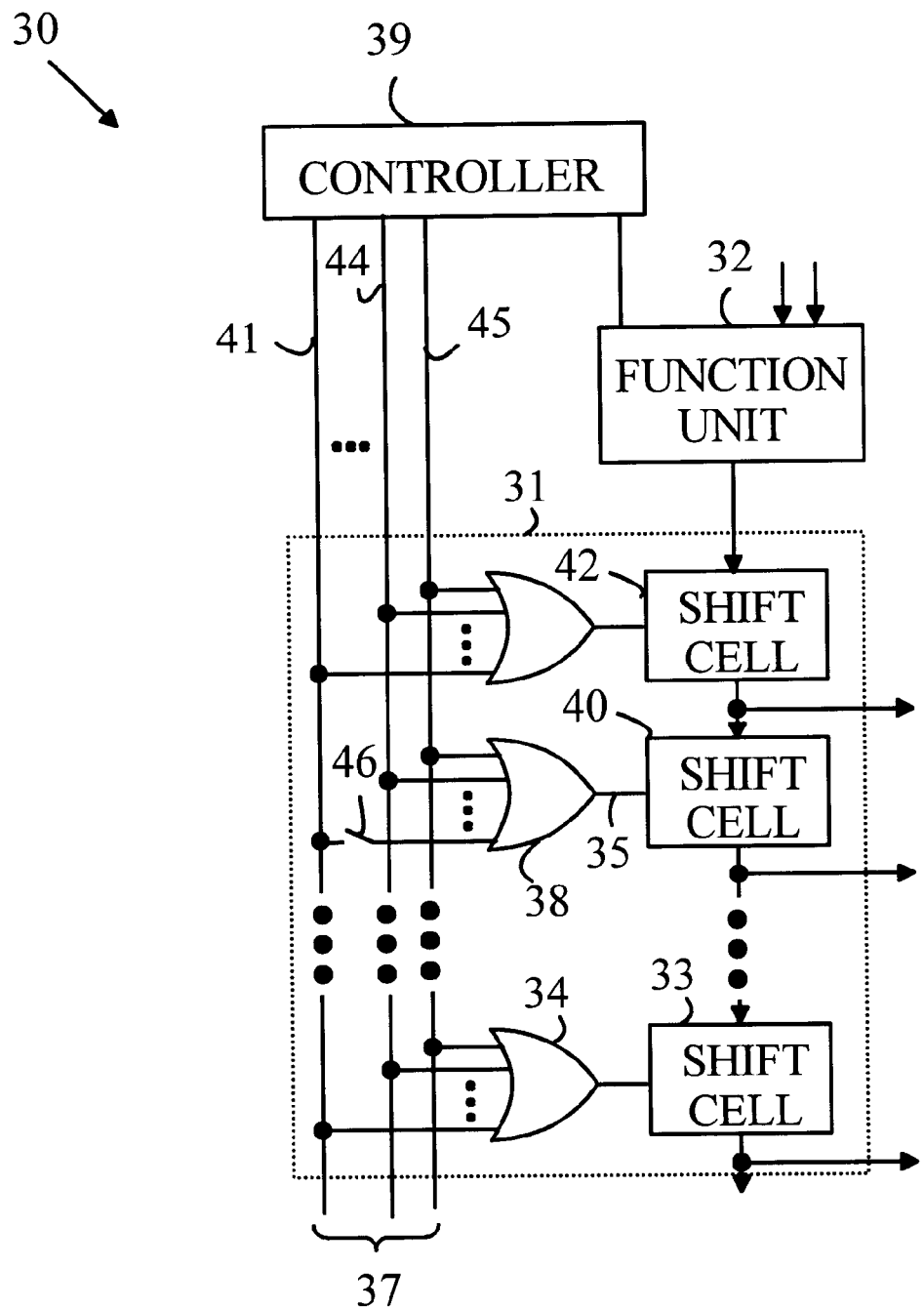
FIG. 3 is a block diagram of one function unit assembly 30 of a hardware accelerator that utilizes a storage register 31 according to the present invention.

The present invention provides a storage register that is similar to a shift register without the limitations of the shift register based storage register discussed above. Refer now to FIG. 3, which is a block diagram of one function unit assembly 30 of a hardware accelerator that utilizes a storage register 31 according to the present invention. Storage register 31 is constructed from a plurality of storage cells 33 that shift in a new result whenever a signal (SE) on a shift enable line 35 is at a predetermined level. When SE is low, the storage cell retains its old value; when SE is high, a new value is latched from the storage cell's input. The SE signal is generated by OR gate 34 that is connected to a plurality of signal lines 37 that will be referred to as the phase bus signals. It should be noted that storage register entries need not be shifted every cycle. For example, if the current result being computed by function unit 32 is not needed in a future computation, the result need not be shifted into storage register 31.

In addition, one or more cells may be held while others shift. Thus, dead values can be overwritten without shifting data out of the storage register. Hence, the length of the storage register is determined by the maximum number of results that will be live at any given time, not by the lifetime of the longest lived result. Accordingly, a storage register according to the present invention is significantly smaller than a conventional shift register based storage register. Reducing the number of cells also helps to reduce interconnect costs. When two operands are read (at distinct moments in time) from the same storage cell and by the same function unit, a single data path may support both data transfers without the need for a multiplexer.

Having provided this overview of the hardware, the manner in which a storage register according to the present invention is controlled will be explained in more detail. As noted above, a loop consists of a network of operations within a loop body that are repeatedly applied to a stream of input data to generate a stream of results. The initiation interval between the execution of adjacent loop iterations within function units in a custom accelerator will be denoted by II. A II of one corresponds to an execution rate, which, after a period of initialization, completes the computation of a loop body every cycle. The storage registers of the present invention are designed to efficiently support II>1 designs. They help reduce both register requirements as well as switching requirements in such low cost custom accelerators. It should be noted that the maximum number of phase bus lines needed to control a storage register according to the present invention is II.

The first cell 42 of the storage register with attached write port is connected to function unit 32, which generates a stream of values into the cell. A new value is shifted into the first cell whenever a new live value is generated by the function unit. Subsequent cells hold values that are shifted out of prior cells. A shift into a subsequent cell occurs when the value within the previous cell is live and when the previous cell must shift to receive another live value, i.e., its predecessor holds a live value that must be shifted out.

Since a new iteration is initiated every II cycles, there are II shift patterns that must be programmed, one for each cycle. Accordingly, each pattern is determined by a different phase bus line. If a particular cell is to shift on the $k^{th}$ cycle, the OR gate for that cell has an input connected to the $k^{th}$ phase line. If the cell is not to shift, no such connection is made. For example, in FIG. 3, OR gate 38 does not have an input connected to phase line 41, and hence, cell 40 will not shift on the cycle corresponding to phase line 41. In contrast, cell 40 will shift on the cycles corresponding to phase lines 44 and 45. In essence, the shift patterns are programmed by setting the connections between the OR gate inputs and the phase bus lines. During operation of the accelerator, the phase lines are then asserted in sequence by controller 39, one per cycle, and the relevant storage cells shift their contents downward.

Storage register 31 can be implemented in custom hardware with the OR gates permanently wired to the phase lines. However, storage register 31 may also be implemented in programmable gate arrays and other forms of programmable hardware. In such cases, the connections between the OR gates and the phase lines may be made via programmable switching elements such as switch 46.

With a clear definition of exactly when all shifts occur within a storage register, it is possible to track where each value within the storage register lies at each moment in time from the shifting history of the storage register. When a value is read by a subsequent operation at a specific moment in time, the storage register element in which that value is stored at that moment in time is identified. A hardware data path is then connected at that moment from the register element holding the data to the function unit port which needs the data in order to support the requisite data transfer. In this manner, storage registers of the present invention can control the sequencing of operands between function units. Tap points for transferring data from a storage register to a particular function unit need only be implemented at the storage register cells that hold a live value that must be read by a function unit.

Figure 4:
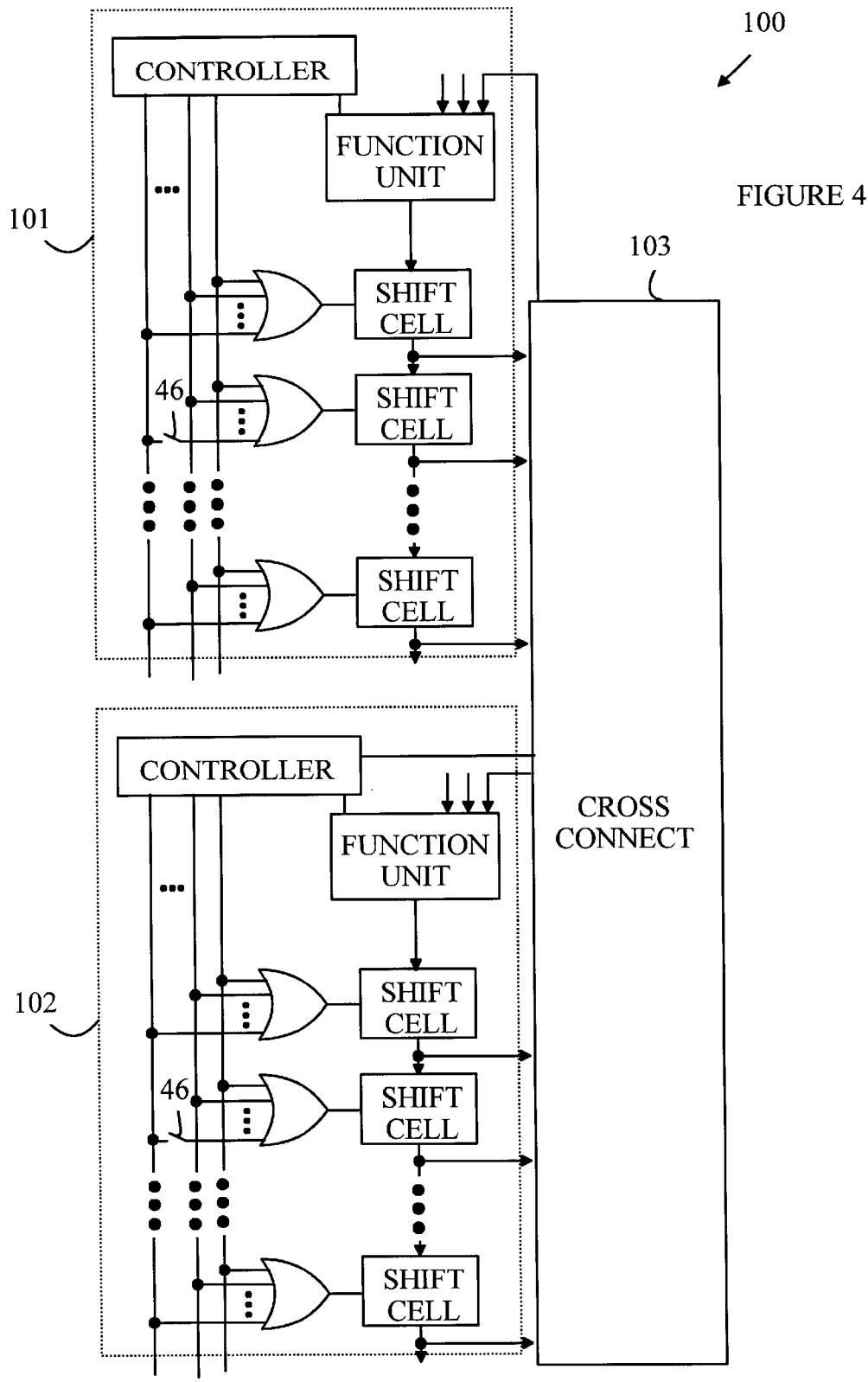
FIG. 4 is a block diagram of a loop accelerator 100 having two function unit assemblies 101 and 102 according to the present invention.

Refer now to FIG. 4, which is a block diagram of a loop accelerator 100 having two function unit assemblies 101 and 102 according to the present invention. The above-described data paths can be hardwired or provided by some form of switching network such as cross-connect switch 103 that connects the outputs of storage registers in the function unit assemblies to the relevant inputs of the various function generators in the accelerator. The specific connections are determined by the phase of the computation, which can be communicated to the cross-connect switch by one of the controllers or a separate controller that coordinates the activities of all the function units in the loop accelerator. If a particular function unit output is not routed to any function unit during the loop, the corresponding switches in the cross-connect switch can be omitted, thereby reducing the cost of the accelerator.

Figure 5:
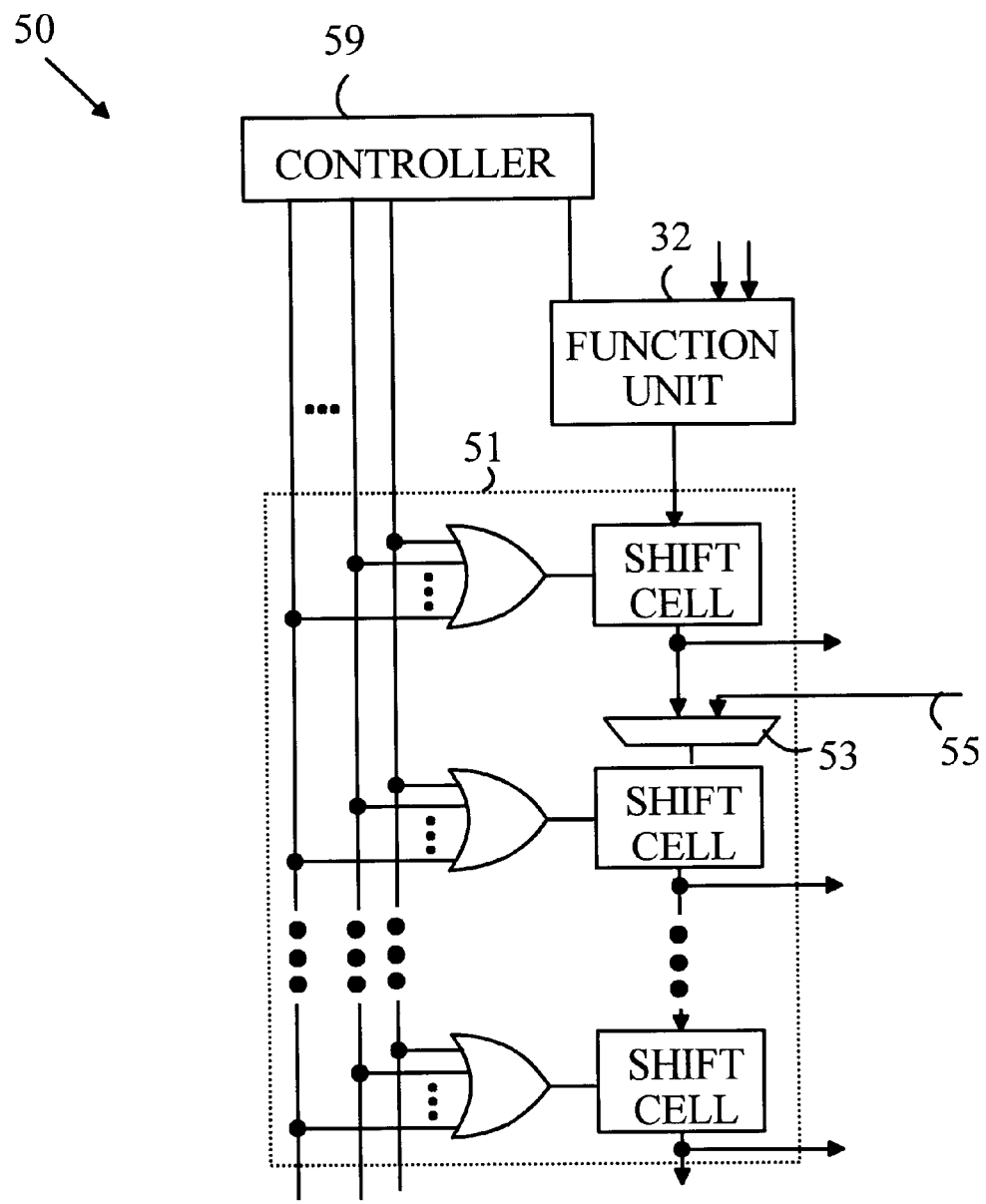
FIG. 5 is a block diagram of one function unit assembly 50 of a hardware accelerator according to the present invention that utilizes a storage register 51 according to the present invention having an additional input into storage register 51.

It should be noted that values may also enter the storage register at cells other than the first cell. Refer now to FIG. 5 which is a block diagram of one function unit assembly 50 of a hardware accelerator according to the present invention that utilizes a storage register 51 according to the present invention having an additional input into storage register 51. In this embodiment, a multiplexer 53 under the control of controller 59 provides an input 55 that can be used for introducing a new value into storage register 51. This input can be connected to other function units via connection paths such as the cross-connect switch shown in FIG. 3. Alternatively, this input could be connected to a different register in the accelerator. Such additional inputs are useful in initializing the function unit prior to the beginning of the loop computation. In addition, such inputs support repeated conditional assignment to a common register or virtual register.

The controlling scheme utilized in the embodiments described above relies on a phase bus that broadcasts the time modulo II in an unencoded format. The phase bus consists of II wires where the $i^{th}$ wire has a predetermined value (e.g. one) precisely on those cycles which are i modulo II. However, other control schemes can also be implemented.

Figure 6:
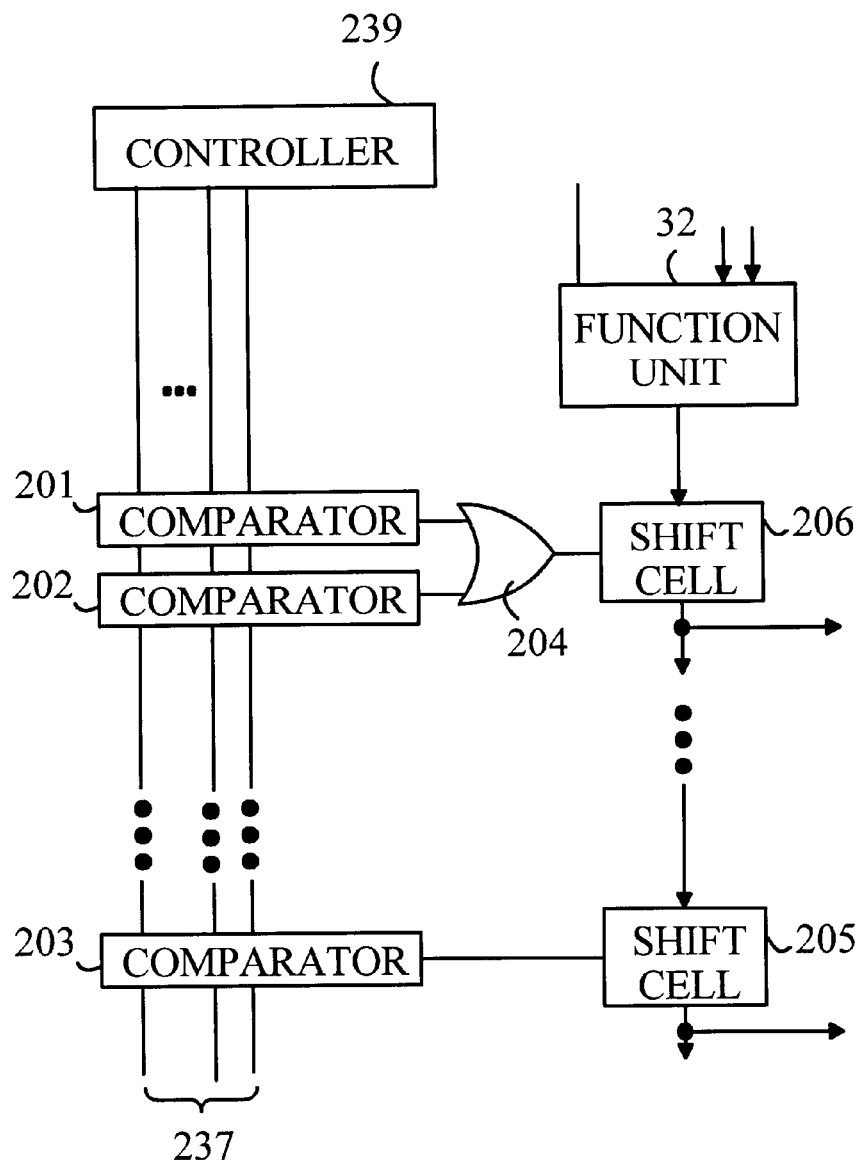
FIG. 6 is a block diagram of an embodiment of the present invention that utilizes a bus having less than II wires.

Refer now to FIG. 6, which is a block diagram of an embodiment of the present invention that utilizes a bus having less than II wires. In this embodiment of the present invention, the time modulo II is broadcast as a binary number on an encoded time bus 237 by controller 239. This requires far fewer wires to be broadcast for large II, but also requires that each of the cells includes one or more comparators that test the value that is broadcast on the encoded time bus against known times at which each cell is scheduled to shift. Exemplary comparators are shown at 201-203. For example, only three wires are needed in the control bus of a II=8 system. Consider a cell 206 that is to shift on the third and fifth cycles. The cell in question has two comparators shown at 201 and 202 that detect these two values on the bus and generate logic signals that are combined by OR gate 204 to cause shifting to occur precisely on either of these conditions. If a cell such as cell 205 only shifts on one count value, a single comparator 203 can be utilized and the OR gate omitted.

Figure 7:
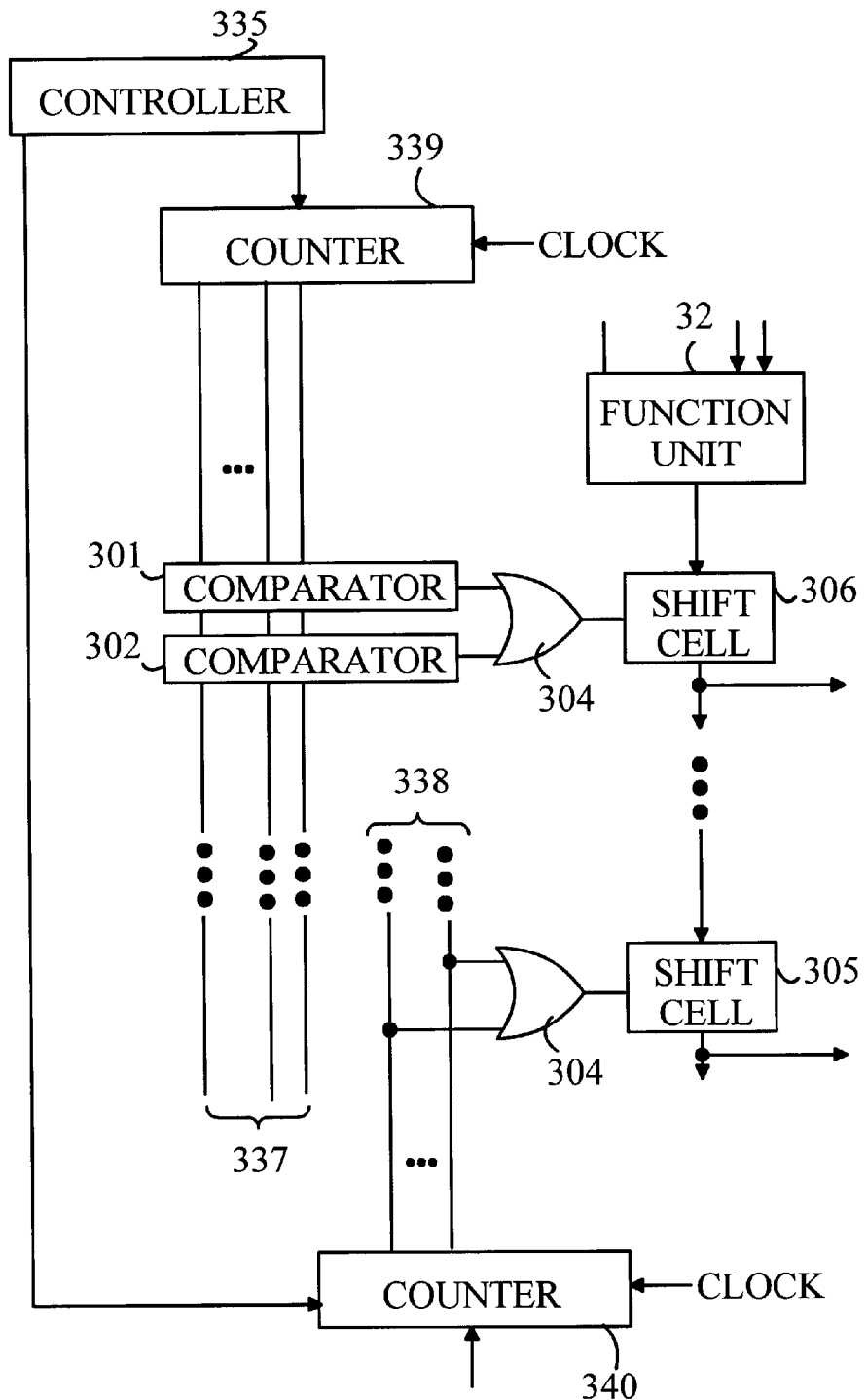
FIG. 7 illustrates an embodiment of the present invention that utilizes two modulo buses to control the shifting of the cells in the storage register.

Embodiments of the present invention in which multiple modulo counters are used may also be constructed. Refer now to FIG. 7, which illustrates an embodiment of the present invention that utilizes two modulo buses shown at 337 and 338 to control the shifting of the cells in the storage register. Each bus is operated from a modulo counter, the modulo counters corresponding to buses 337 and 338 are shown at 339 and 340, respectively. In such embodiments, each modulo counter is set to a predetermined initial state by controller 335. The count in each counter is controlled by a common clock signal. No phase bus or other wiring (except clock) is required to interconnect these counters as the counters count in lock-step harmony. The counters can generate an unencoded phase bus signal or an encoded time bus signal. Counter 339 generates an encoded bus signal, and counter 340 generates an unencoded bus signal in the example shown in FIG. 7. Each shift cell can be attached to the closest or most convenient controller in order to control shifting. In the example shown in the figure, shift cell 306 is connected to bus 337 via comparators 301 and 302, and shift cell 305 is connected to bus 338. The means for decoding shift signals is determined by the type of bus to which the cell is connected. Hence, cell 306 utilizes comparators of the type discussed with respect to FIG. 6, and cell 305 is connected to the individual bus lines directly through OR gate 304.

The use of separate counters or controllers can decrease the amount of interconnect required. For example, if several cells only shift on one or two states of the modulo counter, these cells can be connected to an unencoded bus in which the unused conductors are missing.

The above-described embodiments of the present invention have been discussed in terms of function units that generate one result each cycle. However, it will be appreciated by those skilled in the art that this is the maximum rate at which each function unit outputs results. On some cycles, one or more of the function units may not generate an output. In effect, that function unit generates a null output on the cycle in question. For example, a floating-point unit may require two cycles to complete a result while the other function units require only one cycle. On the first cycle of such a two-cycle sequence, the storage register connected to that function unit will not shift in any new value.

Various modifications to the present invention will become apparent to those skilled in the art from the foregoing description and accompanying drawings. Accordingly, the present invention is to be limited solely by the scope of the following claims.

What is claimed is:

1. A computational unit for use in loop computations, said computational unit initiating one iteration of said loop every II cycles, said computational unit comprising:
    a function unit having a result output for outputting a computational result;
    a first counter having a value that is incremented each cycle and is reset every II cycles;
    a first phase bus having a state determined by said first counter value; and
    a storage register comprising a linear connected array of shift cells having a first shift cell, each shift cell having an input port, an output port, and a shift control port, each shift cell receiving said value to be stored in said shift cell on said input port, said stored value being stored in response to a control signal on said shift control port, said input port of said first shift cell being connected to said result output, each shift cell further comprising a shift control circuit connected to said first phase bus and said shift control port for selectively generating said control signal on said shift control port such that for a particular cycle, a value in at least one shift cell is overwritten by a value of another shift cell.

2. The computational unit of claim 1 wherein said first phase bus comprises II conductors, one conductor corresponding to each of said II cycles, and wherein said shift control circuit comprises an OR gate having an output connected to said shift enable port and one input for each cycle in which that shift cell is to shift, that input being connected to said phase line corresponding to that cycle.

3. The computational unit of claim 1 wherein said first phase bus comprises a binary coded representation of said value in said counter and wherein said shift control circuit comprises a comparator for generating said control signal for each cycle in which that shift cell is to shift.

4. The computational unit of claim 1 further comprising
    a second counter having a value that is incremented each cycle and is reset every II cycles;
    a circuit for causing said first and second counters to assume first and second initial values, respectively;
    a second phase bus having a state determined by said second counter value,
    wherein at least one of said shift cells has its shift control circuit connected to said second phase bus.

5. The computational unit of claim 1 further comprising a multiplexer having first and second inputs and an output, said first input being connected to said output of one of said shift cells and said multiplexer input being connected to said input of a different one of said shift cells.

6. The computational unit of claim 1 wherein said computational unit is implemented in a programmable gate array.

7. The storage register of claim 2 wherein one of said inputs of one of said OR gates is connected to one of said phase lines by a programmable switch.

8. A loop accelerator for initiating one iteration of a loop every II cycles, said loop accelerator comprising a plurality of computational units, each of said computational units comprising:
    a function unit having a result output for outputting a computational result;

a phase line corresponding to each of said II cycles; and a storage register comprising a linear connected array of shift cells having a first shift cell, each shift cell having an input port, an output port, a shift control port, and an OR gate, each shift cell receiving said value to be stored in said shift cell on said input port, said stored value being stored in response to a control signal on said shift control port, said OR gate having an output connected to said shift enable port and one input for each cycle on which that shift cell is to receive said control signal, that input being connected to said phase line corresponding to that cycle, wherein said input port of said first shift cell is connected to said result output; and a cross-connect circuit for coupling at least one shift cell output of one of said computational units to an input of a function unit of another of said computational units on a selected one of said II cycles.

9. A storage register for storing values received on a storage input port, said storage register comprising:

a plurality of phase lines, one corresponding to each of said II cycles; and a linear connected array of shift cells having a first shift cell, each shift cell having an input port, an output port, a shift control port, and an OR gate, each shift cell receiving said value to be stored in said shift cell on said input port, said stored value being stored in response to a control signal on said shift control port, said OR gate having an output connected to said shift enable port and one input for each cycle on which that shift cell is to receive said control signal, that input being connected to said phase line corresponding to that cycle, wherein said input port of said first shift cell is connected to said storage input port.

10. The storage register of claim 9 wherein at least one of said shift cells is not connected to one of said phase lines.

11. The storage register of claim 9 wherein one of said inputs of one of said OR gates is connected to one of said phase lines by a programmable switch.

12. A storage register for storing values received on a storage input port, said storage register comprising:

a phase bus for carrying a count value corresponding to each of II cycles; and a linear connected array of shift cells having a first shift cell, each shift cell having an input port, an output port, a shift control port, and a comparator, each shift cell receiving said value to be stored in said shift cell on said input port, said stored value being stored in response to a control signal on said shift control port, said comparator having an output for generating said control signal and an input connected to said phase bus.

13. The storage register according to claim 12, at least one shift cell further comprising an OR gate having an input connected to said output of said comparator and the OR gate having an output connected to said shift control port.

14. The storage register according to claim 13, said at least one shift cell further comprising a second comparator having an output connected to a second input of the OR gate.

15. A loop accelerator for initiating one iteration of a loop every II cycles, said loop accelerator comprising a plurality of computational units, each of said computational units comprising:

a function unit having a result output for outputting a computational result;

a phase bus for carrying a count value corresponding to each of II cycles;

a linear connected array of shift cells having a first shift cell, each shift cell having an input port, an output port, a shift control port, and a comparator, each shift cell receiving said value to be stored in said shift cell on said input port, said stored value being stored in response to a control signal on said shift control port, said comparator having an output for generating said control signal and an input connected to said phase bus; and a cross-connect circuit for coupling at least one shift cell output of one of said computational units to an input of a function unit of another of said computational units on a selected one of said II cycles.

* * * * *